SWITCHING SYSTEM FOR DRIVING READ-WRITE LINES IN A MAGNETIC MEMORY

Filed Dec. 21, 1965

INVENTORS
ANTHONY D. ROBBI &
JAMES W. TUSKA
BY
Carl V. Olson
Attorney

United States Patent Office 3,469,245
Patented Sept. 23, 1969

3,469,245

SWITCHING SYSTEM FOR DRIVING READ-WRITE LINES IN A MAGNETIC MEMORY

Anthony D. Robbi, Monmouth Junction, and James W. Tuska, Hopewell Township, Mercer County, N.J., assignors to RCA Corporation, a corporation of Delaware Filed Dec. 21, 1965, Ser. No. 515,353
Int. Cl. G11b 5/62
U.S. Cl. 340—174 7 Claims

ABSTRACT OF THE DISCLOSURE

A plurality of bi-directional insulated-gate field-effect transistor switches each have a control electrode connected to a respective word line in a magnetic memory plane. The other current-path electrodes of all transistor switches are connected to a source of alternating current having a substantially sine wave shape and having a period corresponding with a read-write cycle of the memory. A control pulse having a steep leading edge is applied to the control electrode of any selected one of the transistor switches with a timing to render the selected transistor switch conductive from a time just before the peak of a half cycle of the alternating current wave to a time just after the peak of the next following half cycle of opposite polarity.

This invention relates to random-access magnetic memories, and particularly to switching matrix means for applying read and write drive pulses of opposite polarities through any selected one of many access line conductors in a magnetic memory.

Known magnetic core memories commonly employ a read driver for generating a rectangular pulse of one polarity and a write driver for generating a rectangular pulse of the opposite polarity. The drivers operate in sequence so that a write pulse occurs after a fixed time period following the end of a read pulse. Switching means are provided for directing the sequential read and write pulses through any selected one of many access line conductors in the memory.

Word-organized magnetic memories have been recently developed which do not employ discrete individual magnetic cores, but rather employ orthogonal sets of conductors imbedded in a continuous, homogeneous sheet of magnetic ferrite material. These monolithic magnetic memory planes have very closely-spaced word lines to which read and write pulses must be selectively applied. It is desirable to also employ a monolithic construction for the circuits connected to the word lines of the monolithic memory plane.

Insulated-gate field-effect transistors are particularly suited to batch fabrication techniques with dimensions and electrical characteristics that are compatible with a monolithic ferrite memory plane. Two known types of insulated-gate field-effect transistors are the thin film transistor (TFT) and the metal oxide semiconductor (MOS) transistor. Insulated-gate field-effect transistors also have the desirable property when used as a switch that they will conduct current in either direction, and therefore can pass both a read pulse of one polarity and a write pulse of the opposite polarity. However, these transistor switches have the undesirable characteristic of presenting a relatively large capacitance to a source of current connected thereto. The capacitance characteristic of the transistor switches is particularly aggravated when a large number of transistor switches are connected to a driver. A total capacitance is presented to the driver which requires that it be capable of supplying large and useless charging and discharging currents, in addition to the current passed through the MOS switch to a memory word line.

It is a general object of this invention to provide an improved switching system for applying read and write currents to any selected one of many word lines in a magnetic memory.

It is another object to provide an improved switching system, including insulated-gate field-effect transistors, for memory word lines in a monolithic ferrite memory plane.

In accordance with an example of the invention, a plurality of bi-directional insulated-gate field-effect transistor switches are provided each having a control electrode and two current-path electrodes. One of the current-path electrodes of each transistor switch is connected to a respective word line in a magnetic memory plane. The other current-path electrodes of all transistor switches are connected to a source of alternating current having a substantially sine wave shape and having a period corresponding with a read-write cycle of the memory. The transistor switches are nomally biased to not conduct the alternating current wave to the word lines. A control pulse having a steep leading edge is applied to the control electrode of any selected one of the transistor switches with a timing to render the selected transistor switch conductive from a time just before the peak of a half cycle of the alternating current wave to a time just after the peak of the next following half cycle of opposite polarity.

Figure 1:
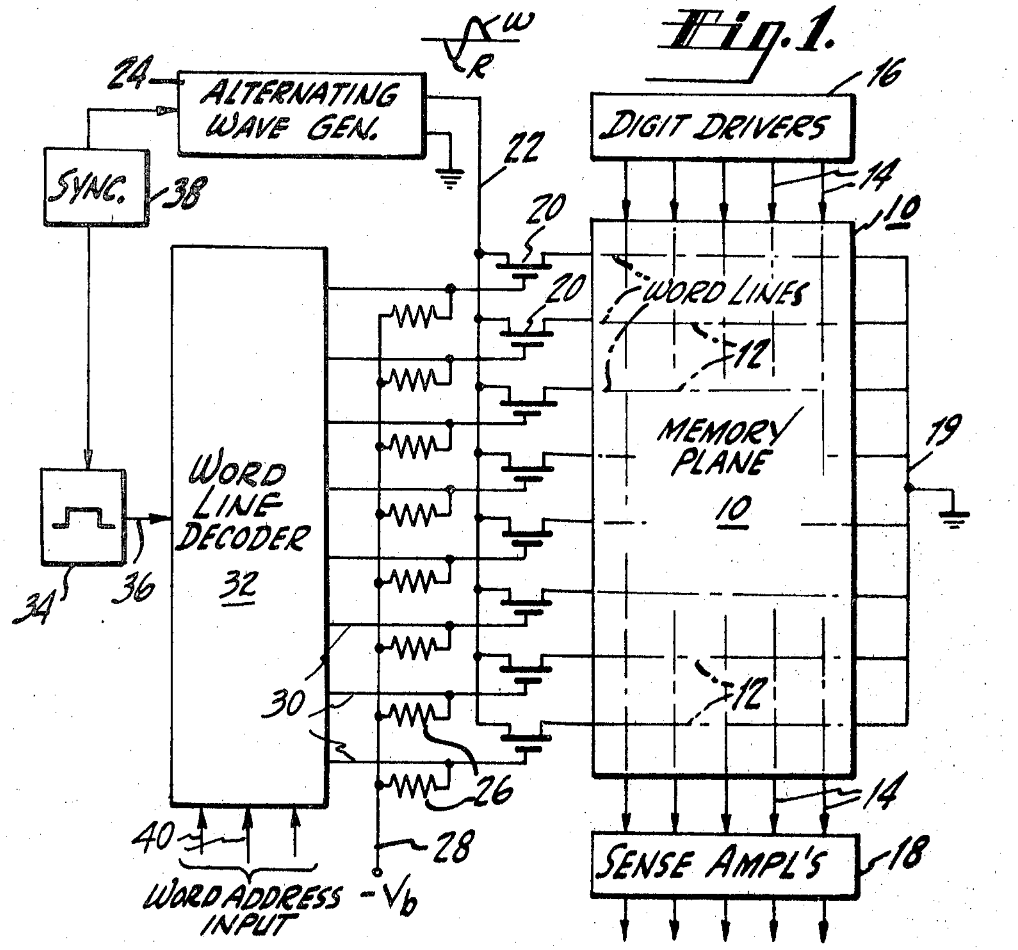
FIG. 1 is a diagram of a word-organized magnetic memory system including the switching system of the invention for applying read and write pulses to any selected memory word line.

Referring now in greater detail to FIG. 1, there is shown a magnetic memory plane 10 made of laminated sintered ferrite and having imbedded parallel word access line conductors 12 extending in one direction, and having imbedded parallel digit-sense conductors 14 extending in an orthogonal direction. The laminated ferrite memory plane 10 may be as described by R. Shahbender et al. in a paper entitled "Laminated Ferrite Memory" published in the Fall Joint Computer Conference Proceedings, November 1963, of the American Federation of Information Processing Societies. The digit-sense conductors 14 in the memory plane 10, as shown, may be connected at one end to respective digit drivers 16, and may be connected at their other ends to respective sense amplifiers 18. The digit-sense conductors 14, digit drivers 16 and sense amplifiers 18 may be arranged for operation using one "core" per information bit, or preferably, two "cores" per information bit.

The switching devices 20 contemplated for use in practicing the invention are of a type known in the art as insulated-gate field-effect transistors. An insulated-gate field-effect transistor may generally be defined as a majority carrier field-effect device, which includes a body of semiconductive material. A gap or carrier conduction channel within the semiconductive body is bounded at one end thereof by a source region and at the other end thereof by a drain region. A gate or control electrode means overlies at least a portion of the gap or carrier conduction channel and is separated therefrom by a region of insulating material. Signals or voltages applied to the gate electrode means control, by field-effect, the conductance of the channel.

Two known types of insulated-gate field-effect transistors are the thin-film transistor (TFT) and the metal oxide semiconductor transistor (MOS). Some of the physical and operating characteristics of a thin-film transistor are described in an article, by P. K. Weimer, entitled, "The TFT—a New Thin-Film Transistor," appearing at pages 1462–1469 of the June 1962, issue of the Proceedings of the IRE. The MOS transistor is described in an article entitled, "The Silicon Insulated-Gate Field-Effect Transistor," by S. R. Hofstein and F. P. Heiman, appearing at pages 1190–1202 of the September 1963, issue of the Proceedings of the IEEE.

Such transistors may be of either the enhancement type or the depletion type. The enhancement type unit is of particular interest in the present application. In an enhancement type unit, the impedance of the conduction channel is very high when the gate and source voltages have the same value. A signal of the proper polarity applied between the gate and source decreases the impedance of the conduction channel. In a depletion type unit, the impedance of the conduction path is relatively low when the source and gate have the same voltage. Input signals of the proper polarity applied between the source and drain increase the impedance of the conduction path.

An insulated-gate field-effect transistor may be either a P-type or an N-type unit depending upon the conductivity type material of the semiconductive body. A P-type unit is one in which the majority carriers are holes; whereas, an N-type unit is one in which the majority carriers are electrons. The switching system of FIG. 1 is shown and described, by way of example, as incorporating N-type metal oxide semiconductor (MOS) transistors 20.

The word line conductors 12 in memory plane 10 are all connected at one of their ends 19 to a common ground or return path, and are connected at their opposite ends to a current-path electrode of a respective bi-directional MOS transistor 20. The other current-path electrodes of all transistors 20 are connected together by a bus 22.

The bus 22 is connected to the output of an alternating wave generator 24 providing an alternating wave output of substantially sinusoidal shape. A wave having a substantially sinusoidal shape is preferred because it does not involve a steeply-rising (negative-going) leading edge at the beginning of a first read half cycle labeled R, or a steeply-rising leading edge at the beginning of a second write half cycle labeled W.

The control electrode of each bi-directional or MOS transistor 20 is connected through a respective bias resistor 26 to a bias bus 28. The bias bus 28 is connected to a bias source (not shown) providing a negative bias voltage designated $-V_b$, which is appropriate for N-type MOS transistors. The control electrodes of all bi-directional or MOS transistors 20 are also connected over lines 30 to respective outputs of a word line decoder 32. The word line decoder 32 receives a pulse from a pulse generator 34 over line 36. The operation of the pulse generator 34 is synchronized with the operation of the alternating pulse generator 24 by means of a synchronizer 38. The decoder 32 has word address inputs 40 which control the passage of the pulse from generator 34 through the decoder to any selected, addressed one of the decoder output lines 30. The decoder 32 may be a conventional "tree" decoder operative by means of gates to complete a circuit from an input line 36 to any selected one of many output lines 30.

In the operation of the memory system of FIG. 1, the bi-directional N-type MOS transistors 20 are normally nonconducting as the result of the application of a bias $-V_b$ through bus 28 and resistors 26 to the control or gate electrodes of all of the transistors 20. The transistor 20, being nonconductive, do not conduct the output of the alternating wave generator 24 to the memory word lines 12. Even though the transistors 20 are nonconductive, they do present a capacitive impedance to the alternating wave generator. However, since the output of the alternating wave generator 24 is not a steep-sided or suddenly-changing wave, the amount of capacitive charging current which the generator must supply is relatively small.

When it is desired to read out the information stored along one of the word lines 12 in the memory plane 10, the address of the desired word line 12 is supplied at the inputs 40 to the word line decoder 32. The decoder 32 then directs a pulse from pulse generator 34 to the selected one of the decoder output lines 30, and to the control electrode of a respective one of the transistors 20. The pulse thus applied to the control electrode of the selected transistor 20 renders, the selected transistor conductive to pass the output of the alternating wave generator 24 to the selected word line 12.

Figure 2:
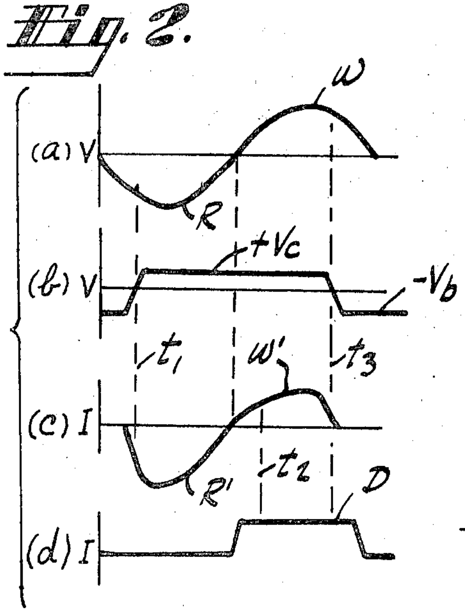
FIG. 2 is a chart of voltage and current waveforms which will be referred to in describing the operation of the system of FIG. 1.
Figure 3:
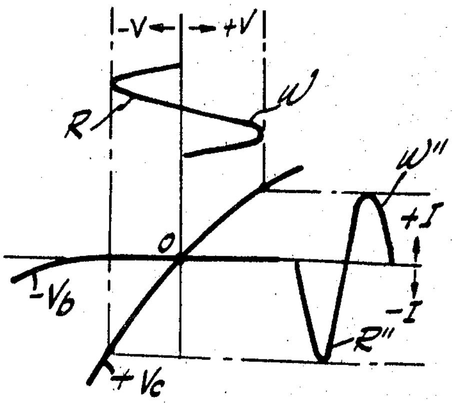
FIG. 3 is a chart illustrating operating characteristics of a MOS transistor useful in the system of FIG. 1.

FIG. 2*a* shows the output of the alternating wave generator 24 to include a read half cycle R followed by an opposite-polarity write half cycle W. FIG. 2*b* shows the control pulse $+V_c$ applied by the decoder 32 to the control electrode of a selected one of the transistors 20. The control pulse $+V_c$ is superimposed on a bias voltage $-V_b$ which normally maintains the transistor in a nonconducting state. The curve $-V_b$ in the current voltage chart of FIG. 3 illustrates the nonconducting current voltage characteristic of the transistor. The curve labeled $+V_c$ in FIG. 3 illustrates the conducting current-voltage characteristic of the transistor when a pulse $+V_c$ is applied to the control electrode of the transistor. If the transistor is maintained in a fully conducting condition, an alternating wave R, W in FIG. 3 applied to the current-path electrodes of the transistor will result in an alternating current wave R″, W″ through the current-path of the transistor.

FIG. 2*c* shows the effect of the control pulse $+V_c$ on the current half cycles R′ and W′ passed by the selected transistor to the associated word line. FIGS. 2*a*, 2*b* and 2*c* show important timing relationships between the input alternating wave R, W, the control pulse $+V_c$ and the output current wave R′, W′. The sharp leading edge of the control pulse $+V_c$ occurs at a time $t_1$ just prior to the peak of the alternating wave R. The selected transistor starts conducting at the time $t_1$ and causes the current pulse $R_1$ applied to the word line to have a steep leading edge. The read current pulse R′ directed through the selected word line 12 in FIG. 1 causes sense signals to be induced on the digit-sense conductors 14 and to be sensed by the sense amplifiers 18. The fact that the read current pulse R′ has a gradually-changing trailing edge does not in any way impair the operation of reading out the stored information.

As shown in FIG. 2*b*, the control pulse $+V_c$ continues until a time $t_3$ occurring just after the peak of the alternating wave half cycle W. The same control pulse $+V_c$ is used for both the read and write half cycles of the alternating wave. A single control pulse $+V_c$ can be used because the transistors 20 are bi-directional or MOS transistors which permit conduction in either direction through the current-path electrodes.

The write current pulse W′ immediately follows the read current pulse R′. The use of a gradual change in current value between the maximum read current R′ and the maximum write current W′ in the opposite direction is unlike prior art arrangements in which steep-sided read and write pulses are separated by a time interval of zero current. A digit pulse D shown in FIG. 2*d*, from a digit driver 16 in FIG. 1, occurs in time-overlapping relationship with the write half cycle W′ (FIG. 2*c*). The digit current in a digit-sense line should be fully present during the interval between time $t_2$ and time $t_3$. The combined amplitudes of the write current W′ and the digit current D cause the switching or rotation of flux at a memory bit storage location to represent the storage of an information bit. The fact that the combined amplitudes of the write current W′ and the digit current D may have a gradually-changing leading edge does not impair the operation of writing information into a storage location.

A read-write current wave as shown in FIG. 2*c* has been found to result in the desired flux switching in the laminated ferrite memory plane 10 shown in FIG. 1. The desired flux switching is achieved in the arrangement according to the invention while at the same time obtaining the benefits of monolithic MOS transistors in combination with a monolithic magnetic memory plane, a minimization of the capacitive charging and discharging current demanded of the alternating wave generator, and a simplification of the pulse generator 34.

In the operation of the monolithic magnetic memory, the read current pulse should have a larger amplitude than the immediately-following, opposite-polarity write current pulse. The read current pulse R′ is required to have an amplitude sufficient to clear the stored information. The write current pulse W′ should have an amplitude which in relation to the amplitude of the digit pulse D causes an optimum amount of flux rotation. The digit pulse, in turn, must be limited in amplitude so that it does not unduly disturb information stored along non-selected word lines. As a result of the foregoing considerations, it has been found that operation of the monolithic memory is optimized when the read current pulse amplitude is larger the write current pulse amplitude.

An MOS transistor as used in applicant's system has a bi-directional current characteristic which is unexpectedly advantageous in providing a read pulse R′ of larger amplitude than a following opposite-polarity write pulse W′. This characteristic is illustrated in FIG. 3 by the shape of the current voltage characteristic $+V_c$ when the transistor is conductive. The shape of the curve is such that a symmetrical voltage wave R, W applied to the current-path electrodes results in a current through the transistor having a half cycle R″ with a larger maximum amplitude than the opposite-direction current W″. The value of the control pulse $+V_c$ applied to the control electrode of the transistor can be selected so that the shape of the current-voltage characteristic provides a desired ratio between the opposite-direction currents R′ and W′ successively flowing through the transistor to the selected word line.

What is claimed is:

1. In a random-access memory system including access lines, the combination of a plurality of bi-directional transistor switches each having a control electrode and two current-path electrodes, one of the current-path electrodes of each transistor switch being connected to a respective one of said access lines, a source of an alternating wave having a substantially sine wave shape and having a period corresponding with a read-write cycle of said memory, the output of said source of an alternating wave being connected to the other current-path electrodes of all of said bi-directional transistor switches, means to bias said transistor switches so they normally do not conduct said alternating wave to said access lines, and means to apply a control pulse having a steep leading edge to the control electrode of any selected one of said transistor switches.

2. The combination as defined in claim 1 wherein said control pulse has a duration less than the duration of one cycle, and more than the duration of a half cycle, of said alternating wave.

3. The combination as defined in claim 1 wherein said control pulse has an amplitude and timing to render the transistor switch conductive from a time just before the peak of a half cycle of said alternative wave to a time just after the peak of the next following half cycle of opposite polarity.

4. The combination as defined in claim 1 wherein said bi-directional transistor switches are insulated-gate field-effect transistors.

5. The combination as defined in claim 1 wherein said bi-directional transistor switches are insulated-gate field-effect transistors, and wherein said control pulse has an amplitude and timing to render a transistor switch conductive from a time just before the peak of a half cycle of said alternative wave to a time just after the peak of the next following half cycle of opposite polarity.

6. The combination of a laminated ferrite magnetic memory plane including imbedded word lines, a plurality of bi-directional insulated-gate field-effect transistors each having a control electrode and two current-path electrodes, one of the current-path electrodes of each transistor being connected to a respective one of said word lines, a source of an alternating wave having a substantially sine wave shape and having a read half cycle followed by an opposite-polarity write half cycle, the output of said source of alternating wave being connected to the other current-path electrodes of all of said transistors, means to bias said transistors so they do not conduct said alternating wave to said word lines, and means to apply a control pulse having a steep leading edge to the control electrode of any selected one of said transistors, said control pulse having an amplitude and timing to render the transistor conductive from a time just before the peak of a read half cycle of said alternative wave to a time just after the peak of the next following write half cycle of opposite polarity.

7. The combination as defined in claim 6 wherein said insulated-gate field-effect transistors are metal oxide semiconductor transistors.

References Cited

UNITED STATES PATENTS

| | | | |
|---|---|---|---|
| 3,246,177 | 4/1966 | Schroeder. | |
| 3,268,658 | 8/1966 | Schroeder et al. | |
| 3,360,786 | 12/1967 | Steele et al. | 340—174 |

BERNARD KONICK, Primary Examiner

S. POKOTILOW, Assistant Examiner